US012633867B2

(12) United States Patent (10) Patent No.: US 12,633,867 B2
Dijken et al. (45) Date of Patent: May 19, 2026

(54) INTEGRATING A SOLAR PANEL IN A VEHICLE BODY PART

(71) Applicant: LIGHTYEAR LAYER IPCO B.V., Helmond (NL)

(72) Inventors: Durandus Kornelius Dijken, Eindhoven (NL); Maikel Van Hest, Lakewood, CO (US)

( * ) Notice: Subject to any disclaimer, the term of this patent is extended or adjusted under 35 U.S.C. 154(b) by 0 days.

(21) Appl. No.: 18/873,636

(22) PCT Filed: Jun. 19, 2023

(86) PCT No.: PCT/EP2023/066475
§ 371 (c)(1),
(2) Date: Dec. 10, 2024

(87) PCT Pub. No.: WO2023/242441
PCT Pub. Date: Dec. 21, 2023

(65) Prior Publication Data
US 2025/0364943 A1 Nov. 27, 2025

(30) Foreign Application Priority Data

Jun. 17, 2022 (NL) ..................................... 2032204

(51) Int. Cl.
H02S 10/40 (2014.01)
B60J 5/04 (2006.01)
(Continued)

(52) U.S. Cl.
CPC ............. H02S 10/40 (2014.12); B60J 5/0452 (2013.01); B60L 8/003 (2013.01); B62D 65/16 (2013.01)

(58) Field of Classification Search
CPC ........ H02S 10/40; H02S 30/10; B60J 5/0452; B60L 8/003; B62D 65/15; B62D 25/00; B60K 2016/003
See application file for complete search history.

(56) References Cited

U.S. PATENT DOCUMENTS

2011/0226312 A1* 9/2011 Bohm ...................... H10F 19/80
136/251
2020/0207213 A1* 7/2020 Kim ........................ H02S 40/34
(Continued)

FOREIGN PATENT DOCUMENTS

EP 2913252 A2 9/2015
EP 3285305 A1 2/2018
(Continued)

OTHER PUBLICATIONS

WO2014050004A1 English Machine Translation (Year: 2014).*
(Continued)

*Primary Examiner* — Kourtney R S Carlson
(74) *Attorney, Agent, or Firm* — Patterson + Sheridan, LLP

(57) ABSTRACT

Method for connecting a solar panel to a frame of a vehicle body part, the method comprising the steps of providing a recess (3) in the frame (2) of the vehicle body part (1), providing at least one inlet opening (6) in the recess, the at least one inlet opening providing a first passage (6a) between the recess and an interior (7a) of the vehicle body part, positioning the solar panel (5) over the recess, therewith defining a volume (10) by the solar panel and the recess, after the step of positioning the solar panel over the recess, providing a filler material (12) via the at least one inlet opening to the recess, filling the volume with the filler material to connect the solar panel to the frame with the filler material.

13 Claims, 7 Drawing Sheets

Figure 1A:
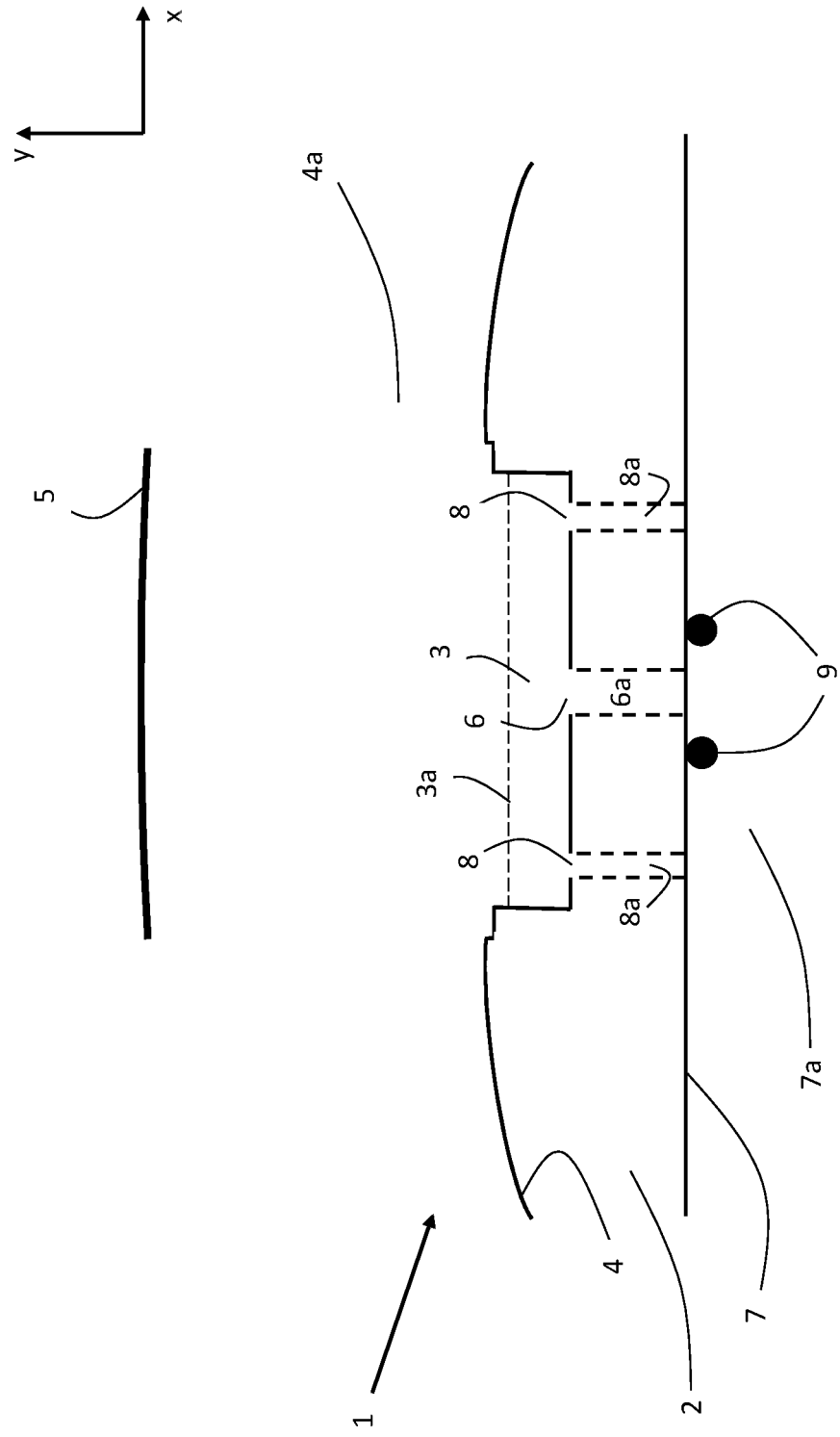

(51) Int. Cl.
  *B60L 8/00*     (2006.01)
  *B62D 65/16*     (2006.01)

(56)               References Cited

U.S. PATENT DOCUMENTS

2020/0321163 A1 * 10/2020 Castellazi ............... B60L 8/003
2022/0348058 A1 * 11/2022 Ueyama ................ B60H 1/244

FOREIGN PATENT DOCUMENTS

| WO | 2010017847 | A1 | 2/2010 | |
|----|----|----|----|----|
| WO | WO-2014050004 | A1 * | 4/2014 | ........... H10F 77/488 |
| WO | 2022122507 | A1 | 6/2022 | |

OTHER PUBLICATIONS

PCT International Search Report and Written Opinion dated Sep. 21, 2023, for International Application No. PCT/EP2023/066475. Netherlands Search Report and Written Opinion dated Jan. 11, 2023, for Netherlands Application No. 2032204.

\* cited by examiner

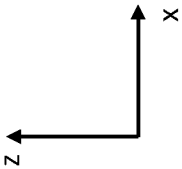
Fig. 2c
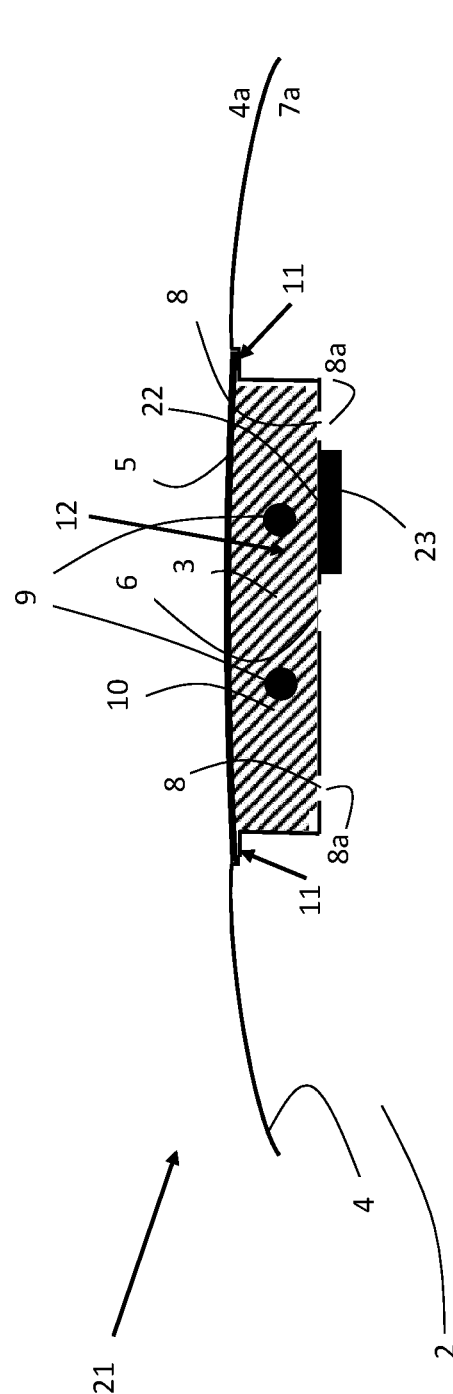

INTEGRATING A SOLAR PANEL IN A VEHICLE BODY PART

The invention pertains to a method for integrating a solar panel in a vehicle body part such as a vehicle door, side panel, trunk or roof.

Photovoltaic (PV) technology is mostly used in grid-connected applications, and there is currently a rapid increase of PV applications in remote areas, such as the providing of solar panels onto the roof of electric vehicles. In this way, the vehicle becomes more energy-independent and environmentally friendly. In general, the solar panel comprises a plurality of solar cells arranged in a serial connection.

To provide a vehicle with a solar panel, the solar panel is typically attached to an exterior surface of the vehicle.

A disadvantage of providing the solar panel to the vehicle is that the overall weight of the vehicle increases. The increase in the overall weight reduces the energy efficiency of the vehicle, because it takes more energy to accelerate the vehicle.

Therefore, it is an object of the present invention to provide a method for providing a vehicle body part with a solar panel, wherein a more lightweight construction can be realised while maintaining the structural strength, or to provide at least an alternative method.

The object of the invention is achieved by a method for connecting a solar panel to a frame of a vehicle body part, the method comprising the steps of:

providing a recess in the frame of the vehicle body part,
  providing at least one inlet opening in the recess, the at least one inlet opening providing a first passage between the recess and an interior of the vehicle body part,
  positioning the solar panel over the recess, therewith defining a volume by the solar panel and the recess,
  after the step of positioning the solar panel over the recess, providing a filler material via the at least one inlet opening to the recess,
  filling the volume with the filler material to connect the solar panel to the frame with the filler material.

For example, the vehicle is a car, train, bus, etc. The vehicle comprises a vehicle body part.

For example, the vehicle body part is a vehicle door, a vehicle roof, a vehicle trunk or a part thereof. The vehicle body part has a frame. The frame is e.g. made from metal, carbon fibre or glass fibre or a mixture thereof. Fibre-based components are particularly suitable for use as large-area structural components, such as for the vehicle roof. The frame, for example, serves for the required level of strength of the vehicle body part.

A solar panel includes solar cells grouped in modules. The solar panel is connected to the frame of the vehicle body part.

So, in the method according to the invention, a recess is provided in the frame of the vehicle body part. It is noted that the recess is provided at an exterior surface of the vehicle body part. The recess defines an opening in the exterior surface of the vehicle body part. The recess is designed in order to fit at least part of a solar panel into the recess.

The recess is provided with at least one inlet opening. The at least one inlet opening provides a first passage between the recess and an interior of the vehicle body part. The at least one inlet opening is for example provided at the centre of the recess. Preferably, the at least one inlet opening is circular. The diameter of the at least one inlet opening is between 8 mm and 40 mm, preferably between 10 mm and 30 mm, more preferably between 10 mm and 20 mm.

When the solar panel is positioned over the recess, a volume is defined between the solar panel and the recess. During the positioning of the solar panel over the recess, preferably the solar panel is positioned with respect to the frame such that the solar panel is flush with the exterior surface of the vehicle body part. For example, the solar panel is integrally integrated in the frame of the vehicle body part. For example, the frame is provided with an edge around the opening defined by the recess. The periphery of the solar panel rests on the edge of the frame. Optionally, before the solar panel is positioned over the recess, a glue or kit is applied at the edge of the frame. The glue or kit can be applied as a line or as dots. Preferably, the glue or kit is an UV curing glue or kit. Alternatively or additionally, the glue or kit is applied at the edge of the solar panel.

After the step of positioning the solar panel over the recess, a filler material is provided via the at least one inlet opening to the recess. For example, the at least one inlet opening is adapted to be coupled to a hose that transfers the filler material via the at least one inlet opening to the recess. The volume between the solar panel and the recess is filled with the filler material via the at least one inlet opening to connect the solar panel to the frame with the filler material. For example, the volume is completely filled by the filler material or is partially filled by the filler material. In case the volume is partially filled by the filler material, the filler material is applied to contact both the solar panel and the frame. For example, the recess is provided with walls that define separate partitions of the volume. The filler material is provided, for example, to one or more partitions, whereas the filler material is not provided to one or more other partitions. Preferably, the filler material is a lightweight material.

In an embodiment, the filler material is a foam filler. Due to the foam structure of the foam filler, the foam filler contributes to the impact resistance of the vehicle body part. Preferably, the filler material is a polyurethane (PUR) filler. PUR fillers have the advantage of being lightweight and stiff materials. Applying PUR fillers also improves the impact resistance for the solar panel.

By providing multiple inlet openings in the recess, e.g. three inlet openings, and thereby using a filler device for each inlet opening, the volume between the solar panel and the frame can be filled more quickly and more evenly. This leads to a faster production time of the vehicle body part.

In an embodiment, the method according to the invention further comprises the steps of providing at least one outlet opening in the recess, the at least one outlet opening providing a second passage between the recess and the interior of the vehicle body part,
  stop providing the filler material via the at least one inlet opening when the filler material is coming out of the at least one outlet opening from the recess to the interior of the vehicle body part.

The recess is provided with at least one outlet opening. The at least one outlet opening provides a second passage between the recess and the interior of the vehicle body part. The at least one outlet opening is for example located at an edge of the recess. Preferably, the at least one outlet opening is circular. The diameter of the at least one outlet opening is between 8 mm and 40 mm, preferably between 10 mm and 30 mm, more preferably between 10 mm and 20 mm.

During the filling of the volume with the filler material via the at least inlet opening, a moment arises wherein the volume is completely filled with the filler material. The moment when the volume is completely filled is visibly detectable when the filler material is coming out of the at least one outlet opening from the recess to the interior of the vehicle body part. Subsequently, it is stopped to provide the filler material via the at least one inlet opening. Hereby, one only uses the required amount of filler material to fill the volume in order to securely connect the solar panel to the frame. This avoids waste of filler material or having the risk of an underfill of the volume.

In an embodiment, the method according to the invention further comprises the step of forming the recess in the frame of the vehicle body part. For example, the recess in the frame is formed by hydroforming. In case of a metal vehicle door, the recess in the frame is formed by stamping or hydroforming.

In an embodiment, the method according to the invention further comprises the step of:

sealing at least part of a periphery of the solar panel to the recess after the step of positioning the solar panel over the recess. By sealing at least part of the periphery of the solar panel to the recess, the position of the solar panel with respect to the vehicle body part can be kept fixed. In this way, it becomes easier to execute the step of the filling of the volume. For example, at least part of the periphery of the solar panel is glued to the recess. Alternatively, putty as sealing material can be used. Preferably, the sealing is based on polyurethane, e.g. a polyurethane line joint. Polyurethane has the advantage of being a lightweight and cheap material. Preferably, the sealing is a watertight seal.

In an embodiment, the method according to the invention further comprises the step of:

providing at least one structural frame element to the frame at the interior of the vehicle body part outside the volume.

The at least one structural frame element is for example a bar, e.g. a metallic bar. The at least one structural frame element is configured to increase the impact resistance of the vehicle body part. For example, a crash impacting on the vehicle body part, e.g. due to a vehicle collision, could deform the vehicle body part substantially. In case the vehicle body part is a vehicle door, a passenger sitting next to the vehicle door is more secured against (severe) impacts against the vehicle body part. The structural frame element absorbs at least a part of the impact force, leading to a more safer construction of the vehicle body part.

In an embodiment, the method according to the invention further comprises the following steps:

before the step of providing the filler material via the at least one inlet opening to the recess, providing a cut-out opening at the interior of the vehicle body part, the cut-out opening providing a third passage between the recess and the interior of the vehicle body part, applying a temporary cover over the cut-out opening, after the step of filling the volume with the filler material, curing the filler material, after curing the filler material, removing the temporary cover.

The cut-out opening at the interior of the vehicle body part provides passage between the recess and the interior of the vehicle body part. The cut-out opening is for example provided next to the at least one inlet opening and/or the at least one outlet opening.

Alternatively, or additionally, the cut-out opening is formed in the recess. For example, the cut-out opening is formed in the recess by laser-cutting.

Subsequently, a temporary cover is applied over the cut-out opening. The temporary cover covers at least the cut-out opening. The temporary cover is for example clamped to the recess such that the temporary cover is pressed against the recess while covering the cut-out opening.

When the temporary cover is applied over the cut-out opening, the volume between the solar panel and the recess is filled with the filler material. After the filing of the volume, the filler material is cured. After the curing of the filler material, the temporary cover is removed.

By providing the cut-out opening and applying the temporary cover, a more lightweight solar panel integrated vehicle body part can be realised.

In an embodiment, the temporary cover has a coating. Preferably, the coating is a polytetrafluoroethylene coating. For example, the coating is a non-sticky permanent layer. For example, the coating is a non-sticky spray. The coating enables an easier removal of the temporary cover from the cured filler material.

In an embodiment, the method according to the invention further comprises the following step:

before positioning the solar panel over the recess, providing at least one structural frame element extending through the recess, wherein after the step of filling the volume with the filler material, the filler material encloses the at least one structural frame element.

The at least one structural frame element is configured to increase the impact resistance of the vehicle body part. By providing at least one structural frame element, e.g. a metallic bar, extending through the recess, a more compact connection of the solar panel to the frame of the vehicle body part can be realised. Because the filler material encloses the at least one structural frame element no additional layers are required to hide the at least one structural frame element, e.g. for esthetical reasons.

In an embodiment, the solar panel is a single curved panel. Alternatively, the solar panel is a double curved panel, wherein the solar panel is curved in two different directions. Using a double curved panel, it is easier to realise that the solar panel, when connected to the frame of the vehicle body part, follows the contours of the vehicle body part, thus lowering the aerodynamic drag coefficient of the vehicle.

In an embodiment, there is provided a vehicle body part manufactured according to any of the embodiments disclosed above. By using the vehicle body part a more lightweight construction can be realised when a solar panel is connected to the frame of the vehicle body part while maintaining the structural strength.

In an embodiment, there is provided a vehicle door comprising the vehicle body part according to the invention.

The invention is described below with reference to the figures. These figures serve as examples to illustrate the invention, and will not be construed as limiting the scope of the claims. In the different figures, like features are indicated by the like reference numerals.

Figure 1B:
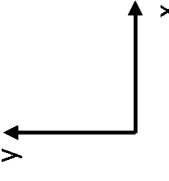
Figure 1B:
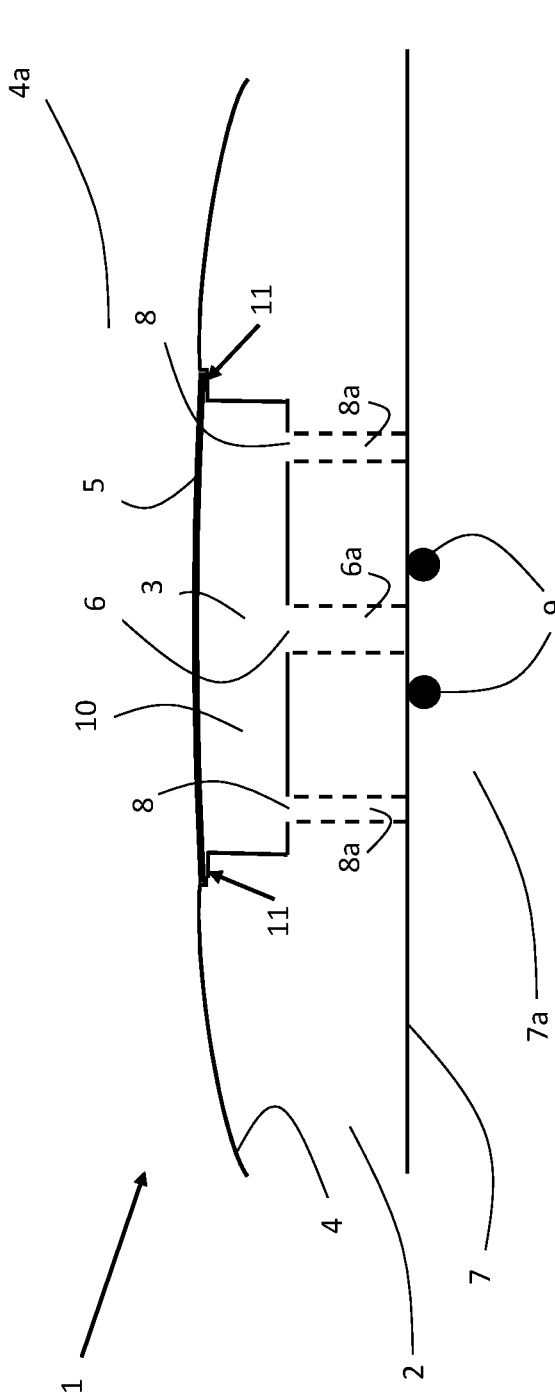
Figure 1C:
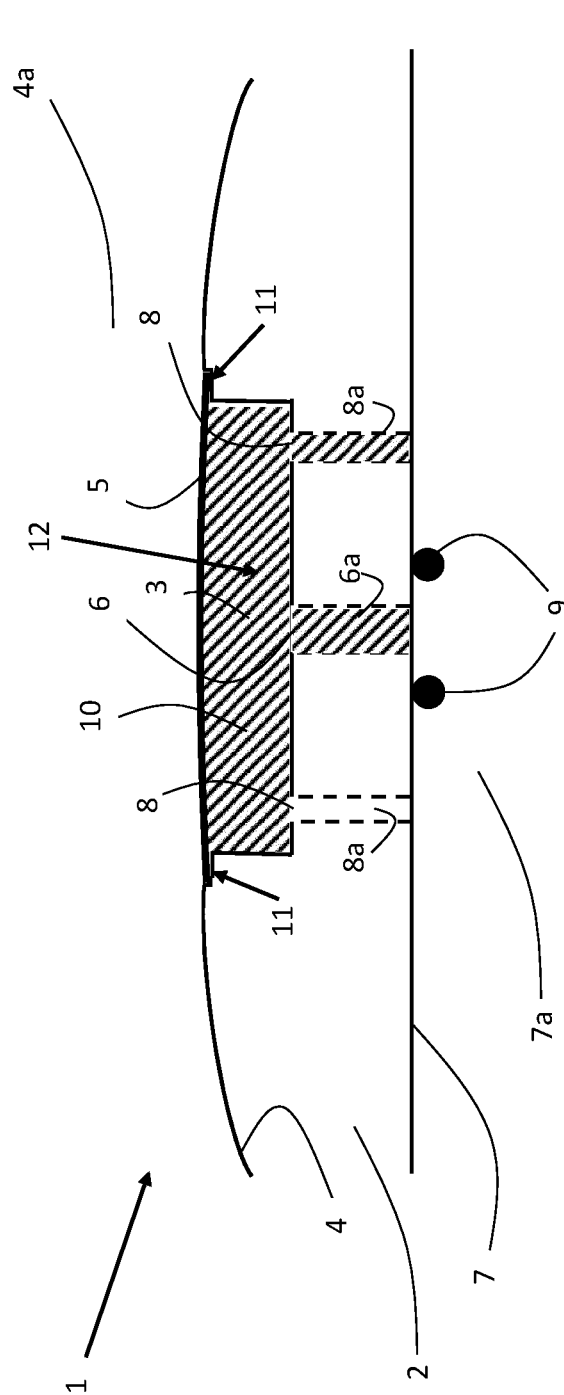

In the figures:

FIGS. 1a-c: Schematically illustrate a first embodiment of the method according to the invention for connecting a solar panel to a frame of a vehicle body part;

FIGS. 2a-d: Schematically illustrate a second embodiment of the method according to the invention for connecting a solar panel to a frame of a vehicle body part.

FIGS. 1a-1c schematically illustrate an embodiment of the method according to the invention for connecting a solar panel to a frame of the vehicle body part. In FIGS. 1a-1c, a cross section is shown of the vehicle body part 1.

In FIGS. 1a-1c, the vehicle body part 1 is for example a part of a vehicle door. In this case, FIGS. 1a-1c show a top view of the vehicle body part 1. Alternatively, when the vehicle body part is for example a part of a vehicle roof, FIGS. 1a-1c would be a front view of the vehicle body part 1.

The vehicle body part 1 has a frame 2. The frame 2 is e.g. made from metal, carbon fibre or glass fibre or a mixture thereof. Fibre-based components are particularly suitable for use as large-area structural components, such as for the vehicle roof. The frame 2, for example, serves for the required level of strength of the vehicle body part 1.

The frame 2 is defined by an exterior surface 4 and an interior surface 7. The exterior surface 4 is arranged at the exterior 4a of the vehicle body part 1. The interior surface 7 is arranged at the interior 7a of the vehicle body part 1. For example, isolation material is provided between the exterior surface 4 and the interior surface 7.

In FIG. 1a, a recess 3 is provided in the frame 2 of the vehicle body part 1. For example, the recess 3 in the frame 2 is formed by hydroforming.

The recess 3 is provided at the exterior surface 4 of the vehicle body part 1. The exterior surface 4 has an exterior side 4a, i.e. the exterior 4a of the vehicle body part 1. The recess 3 defines an opening 3a in the exterior surface 4 of the vehicle body part 1. The recess 3 is designed in order to fit at least part of a solar panel 5 into the recess 3.

In FIG. 1a, the solar panel 5 is a single curved panel having a curvature in the x-direction (see the assigned coordinate system). Alternatively, the solar panel 5 is a double curved panel, wherein the solar panel is curved in two different directions, e.g. in the x-direction and the direction perpendicular thereof (i.e. the direction coming out of the paper). Using a double curved panel, it is easier to realise that the solar panel 5, when connected to the frame 2 of the vehicle body part 1, follows the contours of the vehicle body part 1, thus lowering the aerodynamic drag coefficient of the vehicle.

The recess 3 is provided with an inlet opening 6. The inlet opening 6 provides a first passage 6a between the recess 3 and the interior 7a of the vehicle body part 1. The inlet opening 6 is provided at the centre of the recess 3. Preferably, the inlet opening 6 is circular. The diameter of the inlet opening 6 is between 8 mm and 40 mm, preferably between 10 mm and 30 mm, more preferably between 10 mm and 20 mm.

Additionally, the recess 3 is provided with two outlet openings 8. Each outlet opening 8 provides a second passage 8a between the recess 3 and the interior 7a of the vehicle body part 1. The two outlet openings 8 are located near an edge of the recess 3. Preferably, each outlet opening 8 is circular. The diameter of each outlet opening 8 is between 8 mm and 40 mm, preferably between 10 mm and 30 mm, more preferably between 10 mm and 20 mm.

Further, two structural frame elements 9 are provided to the frame 2 at the interior 7a of the vehicle body part 1. The structural frame elements 9 are metallic bars. The structural frame elements 9 are configured to increase the impact resistance of the vehicle body part 1. For example, a crash impacting on the vehicle body part 1, e.g. due to a vehicle collision, could deform the vehicle body part 1 substantially.

In the embodiment shown in FIGS. 1a-1c, wherein the vehicle body part 1 is part of a vehicle door, a passenger sitting next to the vehicle door is more secured against (severe) impacts against the vehicle body part 1. The structural frame elements 9 absorb at least a part of the impact force, leading to a more safer construction of the vehicle body part 1.

In FIG. 1b, the solar panel 5 is positioned over the recess 3. When the solar panel 5 is positioned over the recess 3, a volume 10 is defined between the solar panel 5 and the recess 3. The solar panel 5 is positioned with respect to the frame 2 such that the solar panel 5 is flush with the exterior surface 4 of the vehicle body part 1. In FIG. 1b, the solar panel 5 is integrally integrated in the frame 2 of the vehicle body part 1. The frame 2 is provided with an edge 11 around the opening defined by the recess 3. The periphery of the solar panel 5 rests on the edge 11 of the frame 2.

Preferably, at least part of a periphery of the solar panel 5 is sealed to the recess 3 after the step of positioning the solar panel 5 over the recess 3. By sealing at least part of the periphery of the solar panel 5 to the recess 3, the position of the solar panel 5 with respect to the vehicle body part 1 can be kept fixed. For example, at least part of the periphery of the solar panel 5 is glued to the recess 3. Alternatively, putty as sealing material can be used. Preferably, the sealing is based on polyurethane, e.g. a polyurethane line joint. Polyurethane has the advantage of being a lightweight and cheap material. Preferably, the sealing is a watertight seal.

After the step of positioning the solar panel 5 over the recess 3, a filler material 12 is provided via the inlet opening 6 to the recess 3. This is visualised in FIG. 1c. For example, a filler device (not shown) is provided at the first passage 6a. The filler device transfers the filler material 12 through the first passage 6a and via the inlet opening 6 to the recess 3. Alternatively, the inlet opening 6 is adapted to be coupled to a hose that transfers the filler material 12 via the inlet opening 6 to the recess 3. The volume 10 between the solar panel 5 and the recess 3 is filled with the filler material 12 to connect the solar panel 5 to the frame 2 with the filler material 12. The volume 10 is completely filled by the filler material 12 (visualised by the dashed region). Alternatively, the volume 10 is partially filled by the filler material 12. In case the volume 10 is partially filled by the filler material 12, the filler material 12 is applied to contact both the solar panel 5 and the frame 2. Preferably, the filler material 12 is a lightweight material.

Note that, in an embodiment, the filler material 12 is transferred to the volume 10 with the volume 10 arranged above the solar panel 5. In such embodiment, the filler material 12 is flowing downward when filling the volume 10, rather than sidewards as in the arrangement shown in FIG. 1c. Regarding the step of filling the volume 10 with the filler material 12 there is no restriction on the orientation of the solar panel 5 with respect to the volume 10.

In an embodiment, the filler material 12 is a foam filler. Due to the foam structure of the foam filler, the foam filler contributes to the impact resistance of the vehicle body part 1. Preferably, the filler material 12 is a polyurethane (PUR) filler. PUR fillers have the advantage of being lightweight and stiff materials.

During the filling of the volume 10 with the filler material 12 via the inlet opening 6, a moment arises wherein the volume 10 is completely filled with the filler material 12. The moment when the volume 10 is completely filled is visibly detectable when the filler material 12 is coming out of at least one outlet opening 8 from the recess 3 to the interior 7 of the vehicle body part 1 via the second passage 8a. Subsequently, it is stopped to provide the filler material 12 via the one inlet opening 6. Hereby, one only uses the required amount of filler material 12 to fill the volume 10 in order to securely connect the solar panel 5 to the frame 2.

This avoids waste of filler material 12 or having the risk of an underfill of the volume 10.

FIGS. 2a-2d schematically illustrate a second embodiment of the method according to the invention for connecting a solar panel to a frame of the vehicle body part. In FIGS. 2a-2d, a cross section is shown of the vehicle body part 21.

In FIGS. 2a-2d, the vehicle body part 21 is for example a part of a vehicle trunk. In this case, FIGS. 2a-2d show a front view of the vehicle body part 1.

The frame 2 of the vehicle body part 21 is defined by an exterior surface 4. The exterior surface 4 has an exterior side 4a, i.e. the exterior of the vehicle body part 21, and an interior side 7a, i.e. the interior 7a of the vehicle body part 21. Both sides 4a, 7a are arranged opposite to each other.

In FIGS. 2a-2d, the two structural frame elements 9 are provided in the recess 3. The structural frame elements 9 extend through the recess 3.

Figure 2A:
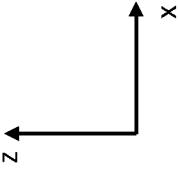
Figure 2A:
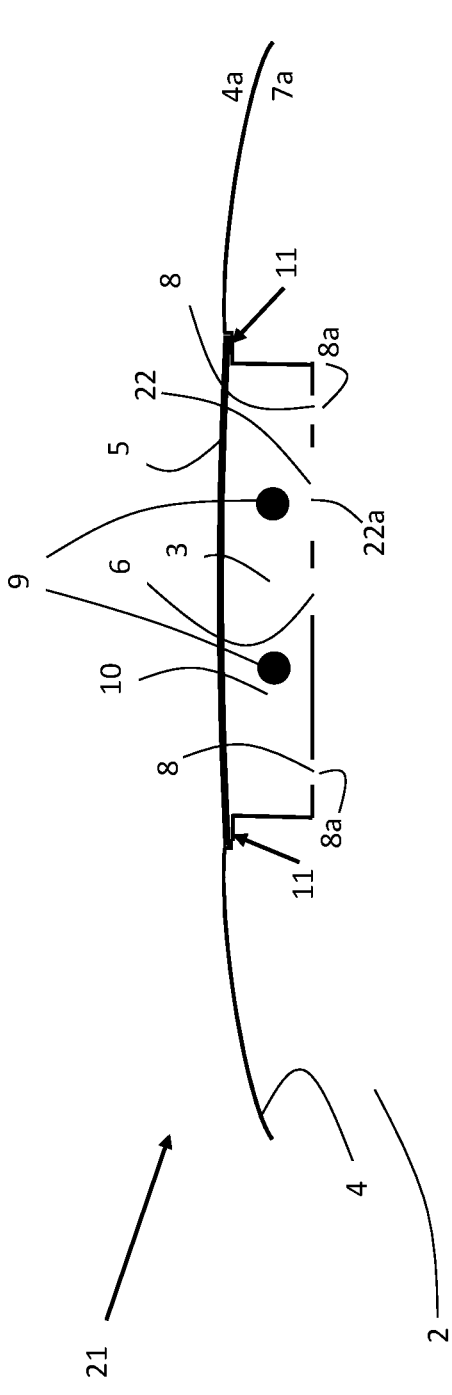

In FIG. 2a, the solar panel 5 is positioned over the recess 3. Further, a cut-out opening 22 is provided in the interior 7a of the vehicle body part 21. The cut-out opening 22 provides a third passage 22a between the recess 3 and the interior 7a of the vehicle body part 21. The cut-out opening 22 is provided next to the inlet opening 6 and the outlet opening 8. For example, the cut-out opening 22 is formed in the recess 3 by laser-cutting.

Figure 2B:
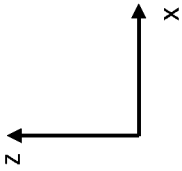
Figure 2B:
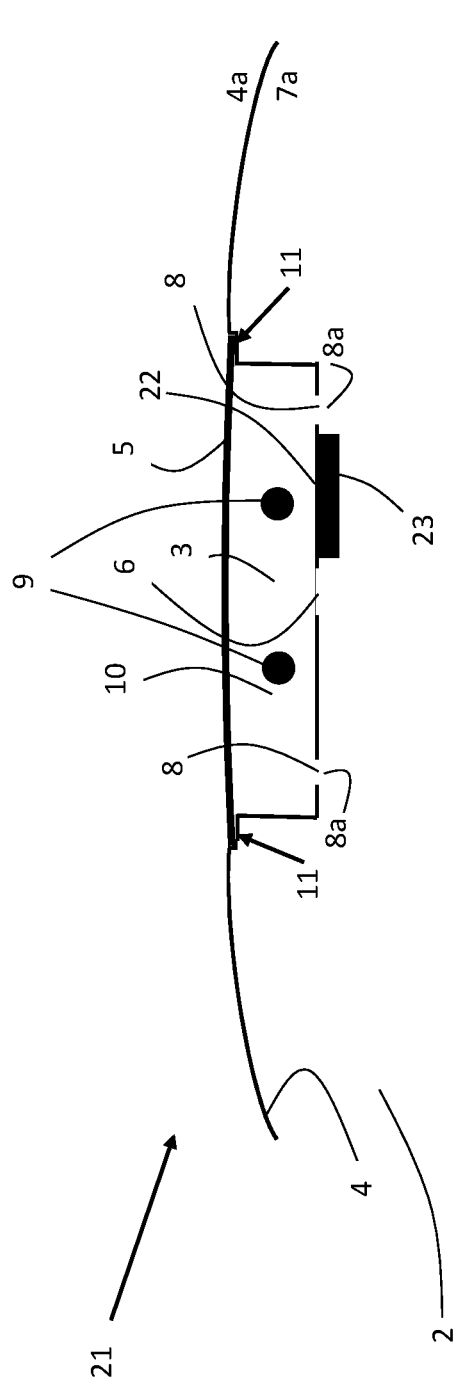
Figure 2D:
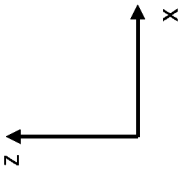
Figure 2D:
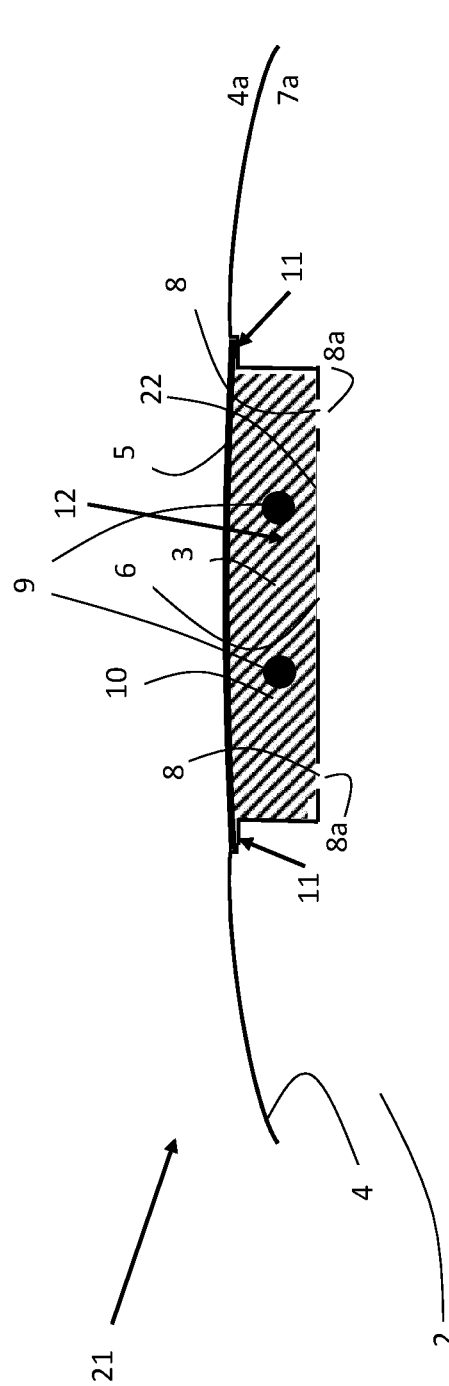

Subsequently, a temporary cover 23 is applied over the cut-out opening 22 (see FIG. 2b). The temporary cover 23 covers the cut-out opening 22. The temporary cover 23 is for example clamped to the recess 3 such that the temporary cover 23 is pressed against the recess 3 while covering the cut-out opening 22.

In FIG. 2c, the volume 10 between the solar panel 5 and the recess 3 is filled with the filler material 12. The filler material 12 encloses the structural frame elements 9. After the filing of the volume 10, the filler material 12 is cured. After the curing of the filler material 12, the temporary cover 23 is removed (see FIG. 2d).

By providing the cut-out opening 22 and applying the temporary cover 23, a more lightweight solar panel integrated vehicle body part can be realised.

The invention claimed is:

1. A method for connecting a solar panel to a frame of a vehicle body part, the method comprising the steps of:
   providing a recess in the frame of the vehicle body part,
   providing at least one inlet opening in the recess, the at least one inlet opening providing a first passage between the recess and an interior of the vehicle body part,
   positioning the solar panel over the recess, therewith defining a volume by the solar panel and the recess,
   after the step of positioning the solar panel over the recess, providing a filler material via the at least one inlet opening to the recess, and
   filling the volume with the filler material to connect the solar panel to the frame with the filler material.

2. The method according to claim 1, further comprising the following steps:

providing at least one outlet opening in the recess, the at least one outlet opening providing a second passage between the recess and the interior of the vehicle body part, and
   stop providing the filler material via the at least one inlet opening when the filler material is coming out of the at least one outlet opening from the recess to the interior of the vehicle body part.

3. The method according to claim 1, further comprising the step of:
   sealing at least part of a periphery of the solar panel to the recess after the step of positioning the solar panel over the recess.

4. The method according to claim 3, wherein the step of sealing at least part of the periphery of the solar panel to the recess comprising gluing at least part of the periphery of the solar panel to the recess, preferably by a polyurethane line joint.

5. The method according to claim 1, further comprising the step of:
   forming the recess in the frame of the vehicle body part.

6. The method according to claim 1, further comprising the step of:
   providing at least one structural frame element to the frame at the interior of the vehicle body part outside the volume.

7. The method according to claim 1, further comprising the following steps:
   before the step of providing the filler material via the at least one inlet opening to the recess, providing a cut-out opening at the interior of the vehicle body part, the cut-out opening providing a third passage between the recess and the interior of the vehicle body part,
   applying a temporary cover over the cut-out opening,
   after the step of filling the volume with the filler material, curing the filler material, and
   after curing the filler material, removing the temporary cover.

8. The method according to claim 7, wherein the temporary cover has a coating, preferably a polytetrafluoroethylene coating.

9. The method according to claim 1, further comprising the following step:
   before positioning the solar panel over the recess, providing at least one structural frame element extending through the recess, wherein after the step of filling the volume with the filler material, the filler material encloses the at least one structural frame element.

10. The method according to claim 1, wherein the filler material is a foam filler, preferably a polyurethane filler.

11. The method according to claim 1, wherein the solar panel is single curved or double curved.

12. A vehicle body part manufactured according to the method of claim 1.

13. A vehicle door comprising the vehicle body part according to claim 12.

* * * * *